(12) United States Patent
Duernegger et al.

(10) Patent No.: US 11,485,005 B2
(45) Date of Patent: Nov. 1, 2022

(54) HANDHELD POWER TOOL

(71) Applicant: C. & E. Fein GmbH, Schwaebisch Gmuend-Bargau (DE)

(72) Inventors: Wolfgang Duernegger, Schorndorf (DE); Horst Fahrner, Stuttgart (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 770 days.

(21) Appl. No.: 16/436,234

(22) Filed: Jun. 10, 2019

(65) Prior Publication Data
US 2019/0375088 A1 Dec. 12, 2019

(30) Foreign Application Priority Data
Jun. 8, 2018 (DE) ..................... 10 2018 113 730.3

(51) Int. Cl.
*B25F 5/00* (2006.01)
*B23Q 11/08* (2006.01)
*B24B 23/02* (2006.01)
*B25F 5/02* (2006.01)

(52) U.S. Cl.
CPC .............. *B25F 5/008* (2013.01); *B23Q 11/08* (2013.01); *B24B 23/028* (2013.01); *B25F 5/02* (2013.01)

(58) Field of Classification Search
CPC . B25F 5/008; B25F 5/02; B23Q 11/08; B24B 23/028; B25D 2217/0065
USPC ........................................................ 451/344
See application file for complete search history.

(56) References Cited

U.S. PATENT DOCUMENTS

| | | | | |
|---|---|---|---|---|
| 5,170,851 A | * | 12/1992 | Kress ..................... | B25F 5/008 310/47 |
| 6,293,859 B1 | * | 9/2001 | Fink ........................ | B25F 5/02 451/344 |
| 6,907,942 B2 | * | 6/2005 | Kikuchi .................. | B25F 5/008 173/117 |
| 8,398,465 B2 | * | 3/2013 | Hoeschele ............. | B25F 5/008 451/454 |
| 9,537,370 B2 | * | 1/2017 | Hess ....................... | B25F 5/02 |
| 9,597,624 B2 | * | 3/2017 | Hiller ..................... | B25F 5/008 |
| D877,588 S | * | 3/2020 | Hill ........................ | D8/62 |
| 10,888,808 B2 | * | 1/2021 | Esenwein .......... | B01D 46/0005 |
| 2006/0254897 A1 | * | 11/2006 | Hamisch .................. | B25F 5/02 200/401 |
| 2006/0276116 A1 | * | 12/2006 | Reich .................... | B24B 55/10 15/339 |
| 2010/0323593 A1 | * | 12/2010 | Hoeschele ............ | B24B 23/028 451/454 |

(Continued)

FOREIGN PATENT DOCUMENTS

DE 10303400 A1 9/2003
DE 202005007594 U1 9/2006

(Continued)

*Primary Examiner* — Dariush Seif
(74) *Attorney, Agent, or Firm* — Muncy, Geissler, Olds & Lowe, P.C.

(57) ABSTRACT

A handheld power tool having a drive driving a motor shaft, which is accommodated in a power tool housing, in which at least one air inlet covered by a dust protection element is formed, and having a tool interface for connecting a tool. The dust protection element is pushed onto the power tool housing in an insertion direction and is secured on the power tool housing.

12 Claims, 4 Drawing Sheets

(56) References Cited

U.S. PATENT DOCUMENTS

| | | | | |
|---|---|---|---|---|
| 2011/0226499 | A1* | 9/2011 | Kakiuchi | B23Q 11/0046 173/75 |
| 2015/0209949 | A1* | 7/2015 | Milbourne | B24B 23/04 29/434 |
| 2015/0328573 | A1* | 11/2015 | Hiller | B24B 23/028 55/504 |
| 2017/0361416 | A1* | 12/2017 | Lutz | B25F 5/008 |
| 2018/0222011 | A1* | 8/2018 | Eisenblaetter | B24B 41/02 |
| 2018/0319002 | A1* | 11/2018 | Esenwein | H02K 5/207 |
| 2018/0326337 | A1* | 11/2018 | Esenwein | B25F 5/02 |
| 2019/0091848 | A1* | 3/2019 | Walker | B25F 5/001 |
| 2020/0276694 | A1* | 9/2020 | Esenwein | B25F 5/008 |

FOREIGN PATENT DOCUMENTS

| | | |
|---|---|---|
| DE | 102008009277 A1 | 8/2009 |
| DE | 102015211646 A1 | 12/2016 |
| DE | 102015225783 A1 | 6/2017 |
| DE | 102016213618 A1 | 8/2017 |
| DE | 102016106557 A1 | 10/2017 |
| EP | 2944423 A1 | 11/2015 |
| JP | 2009262296 A | 11/2009 |
| JP | 2010036260 A | 2/2010 |
| JP | 2016007680 A | 1/2016 |

* cited by examiner

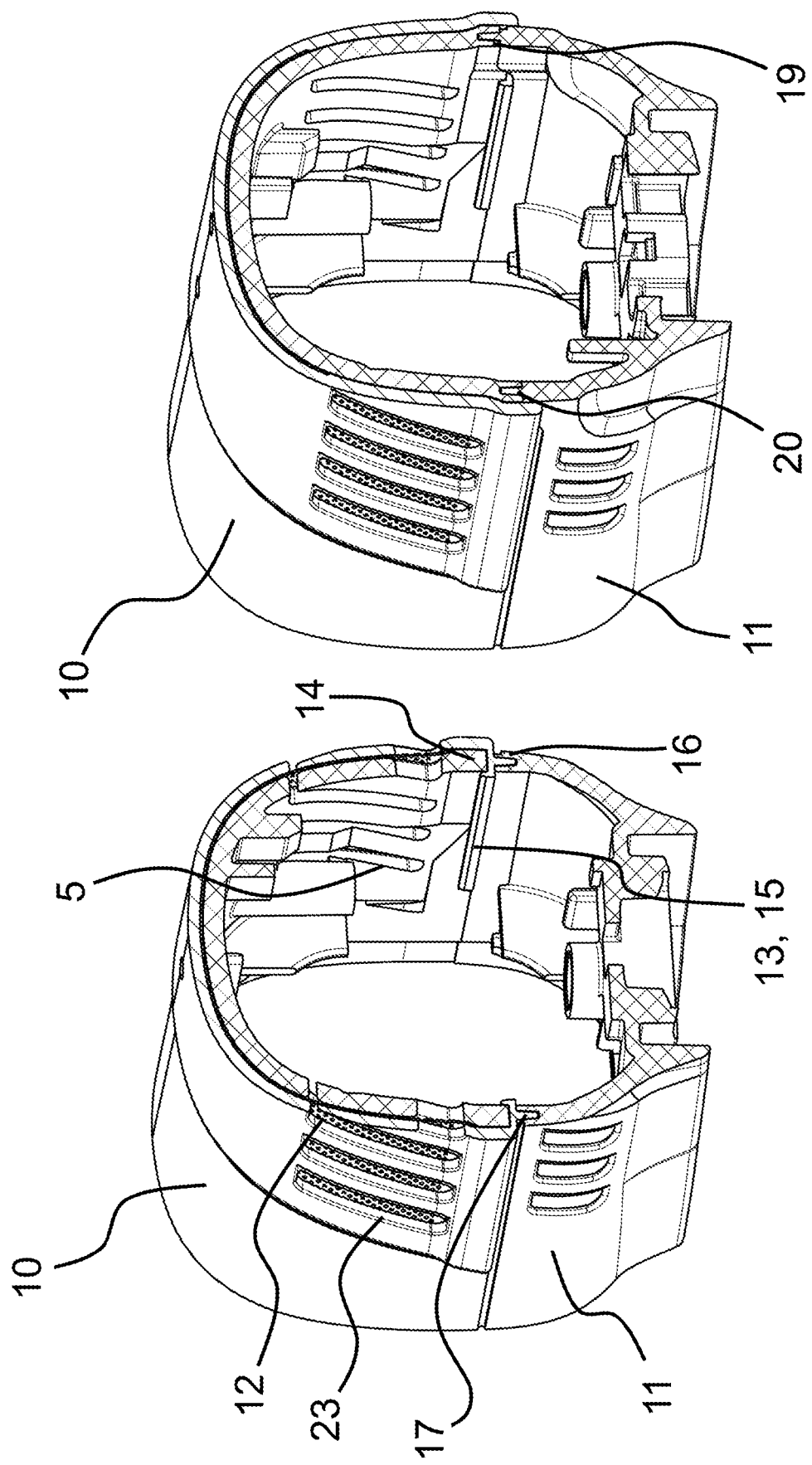

HANDHELD POWER TOOL

This nonprovisional application claims priority under 35 U.S.C. § 119(a) to German Patent Application No. 10 2018 113 730.3, which was filed in Germany on Jun. 8, 2018, and which is herein incorporated by reference.

BACKGROUND OF THE INVENTION

Field of the Invention

The present invention relates to a handheld power tool, comprising a drive driving a motor shaft, which is accommodated in a power tool housing, in which at least one air inlet covered by a dust protection element is formed, as well as comprising a tool interface for connecting a tool.

Description of the Background Art

In handheld power tools, for example in angle grinders, the problem exists that chips are produced when processing material, which may damage the handheld power tool if they enter the interior thereof. This problem occurs, in particular, when processing metal, since the resulting particles and chips are electrical conductive, so that, if they enter the interior of the handheld power tool, there is the danger of short-circuits occurring, whereby under certain circumstances the handheld power tool itself is energized, which would be associated with a danger of electrical shock to the user. Dust protection elements are therefore often used, which cover the air inlet and with which a penetration of contaminants into the interior of the handheld power tool is to be avoided.

Handheld power tools of this type are known, for example, from DE 10 2008 009 227 A1. In these handheld power tools known from the prior art, the dust protection element, with which the interior of the handheld power tool is protected against the penetration of contaminants, in particular against the penetration of metal chips, is clipped onto the power tool from below. However, it has proven to be disadvantageous that the dust protector must be partially bent when it is clipped on, in order to clip it into the power tool housing. This type of attachment also gives rise to the problem that the dust protector is not securely attached to the power tool, since it may become loose and slide off the handheld power tool, in particular when vibrations occur.

SUMMARY OF THE INVENTION

It is therefore an object of the present invention to to reduce the aforementioned disadvantages and to provide an improved attachment of the dust protection element to the handheld power tool.

According to an exemplary embodiment of the invention, this object is achieved in a handheld power tool, in that the dust protection element is pushed onto the power tool housing along an insertion direction and is secured on the power tool housing.

In that the dust protection element only has to be pushed onto the power tool housing in the insertion direction, a particularly easy attachment is provided, which makes it possible to secure the dust protection element on the power tool housing without deforming it, which has a positive effect on the assembly complexity and longevity of the dust protection element. The insertion direction may be oriented essentially in parallel or essentially perpendicularly to the motor shaft. The wording, "essentially in parallel," covers an angle range between the motor shaft and the insertion direction which is preferably between −35° and 35° and which is particularly preferably 0°. The wording, "essentially perpendicularly," covers an angle range between the motor shaft and the insertion direction which is preferably between 55° and 125° and which is particularly preferably 90°. The insertion along the insertion direction may take place from the side facing away from the tool interface, i.e. from the back, or from the side facing the tool interface, i.e. from the front.

The power tool housing can have an at least two-part design and comprises a first housing part and a second housing part, the dust protection element being secured on the first housing part by the second housing part. This achieves the fact that the dust protection element pushed onto the first housing part is secured only by the second housing part, whereby, in particular, the axial position of the dust protection part is fixed in the assembled state of the handheld power tool and is unable to disengage from the handheld power tool, in particular even if vibrations occur.

The dust protection element can at least partially surround the power tool housing on the outside thereof and has a receiving section, with which a coupling section formed on the power tool housing interacts. Due to the use of the receiving section formed on the dust protection element, and due to the corresponding coupling section assigned to the power tool housing, the insertion direction is ultimately fixed, and a guidance for the dust protection element is formed, which represents a particularly simple way to push the dust protection element onto the power tool housing and secure it thereon.

The guidance may also be further simplified in that the receiving section can have an undercut. Due to this undercut, a rail is ultimately provided, which acts as a guide, so that, during assembly, an assembler only has to push the dust protection element onto the corresponding coupling section of the power tool housing with the aid of the undercut formed on the receiving section, whereby the assembly is further simplified. In this connection, it has also proven to be successful if the undercut has an L-shaped cross section. Due to the L-shaped cross section of the undercut, a guide is also provided perpendicularly to the insertion direction, which has a favorable effect on the positioning of the dust protection element on the power tool housing. Within the scope of the invention, it is also provided, in particular, that the coupling section and the receiving section are each provided multiple times, particularly preferably twice.

The seating of the dust protection element in the power tool housing may be further improved if at least one securing tab is formed on the dust protection element, which engages with at least one securing recess formed on the power tool housing for forming a latching connection. A stop is provided by the securing recess, which limits the pushing of the dust protection element onto the power tool housing along the insertion direction, whereby, in particular, the axial position of the dust protection element on the power tool housing is fixed. The latching connection is ultimately a securing component for the dust connection element on the power tool housing.

A tongue and groove joint can be formed between the first housing part and the second housing part and/or between the dust protection element and the second housing part. The use of the tongue and groove joint between the first housing part and the second housing part makes it possible to define the position thereof with respect to each other. In addition, a penetration of contaminants, such as electrically conductive particles or chips, into the interior of the power tool housing at the point of contact between the first housing part and the second housing part is effectively prevented thereby. Moreover, if a tongue and groove joint is also formed between the second housing part and the dust protection element, the position of the dust protection element, in particular, may be fixed thereby. The term, tongue and groove joint, explicitly also covers tongue in groove joints.

An insertion chamfer can be formed on the second housing part. When the second housing part is mounted on the first housing part, the dust protection element is moved hereby axially in the insertion direction with the aid of the insertion chamfer formed on the second housing part, whereby any clearance that may be present between the dust protection element and the first housing part is reduced.

To prevent the penetration of contaminants, such as metallic chips and particles, into the interior of the power tool housing, at least one screen structure can be assigned to the dust protection element, which at least partially overlaps the at least one air inlet when the dust protection element has been mounted. The screen structure may be designed as a single piece or comprise multiple sections. The screen structure may also be cast into the dust protection element or be otherwise fastened thereto, for example by gluing. In this connection, it has also proven to be successful if the screen structure has a mesh width between 0.100 mm and 0.500 mm and is, in particular, 0.250 mm. The selection of the mesh width makes it possible to control the particle size at which particles are able to enter the handheld power tool. The mesh width may thus be selected in such a way that particles which would negatively influence the functionality or the life span of the handheld power tool according to the invention are held back by the screen structure. However, if too small a mesh width of the screen structure is selected, this results in the fact that the through-flow of the handheld power tool by cooling air is not sufficiently ensured, which would also prove to be disadvantageous.

In particular, the assembly complexity may be further reduced by the fact that the first housing part and the second housing part are connected to each other by a screw connection. The screw connection makes it possible to particularly easily connect the two housing parts to each other, so that, in particular, a replacement of the dust protection element is possible, for example for cleaning purposes or for maintenance work.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows a perspective sectional view along section III-Ill from FIG. 2;

FIG. 4 shows a perspective sectional view along section IV-IV from FIG. 2.

DETAILED DESCRIPTION

Figure 1:
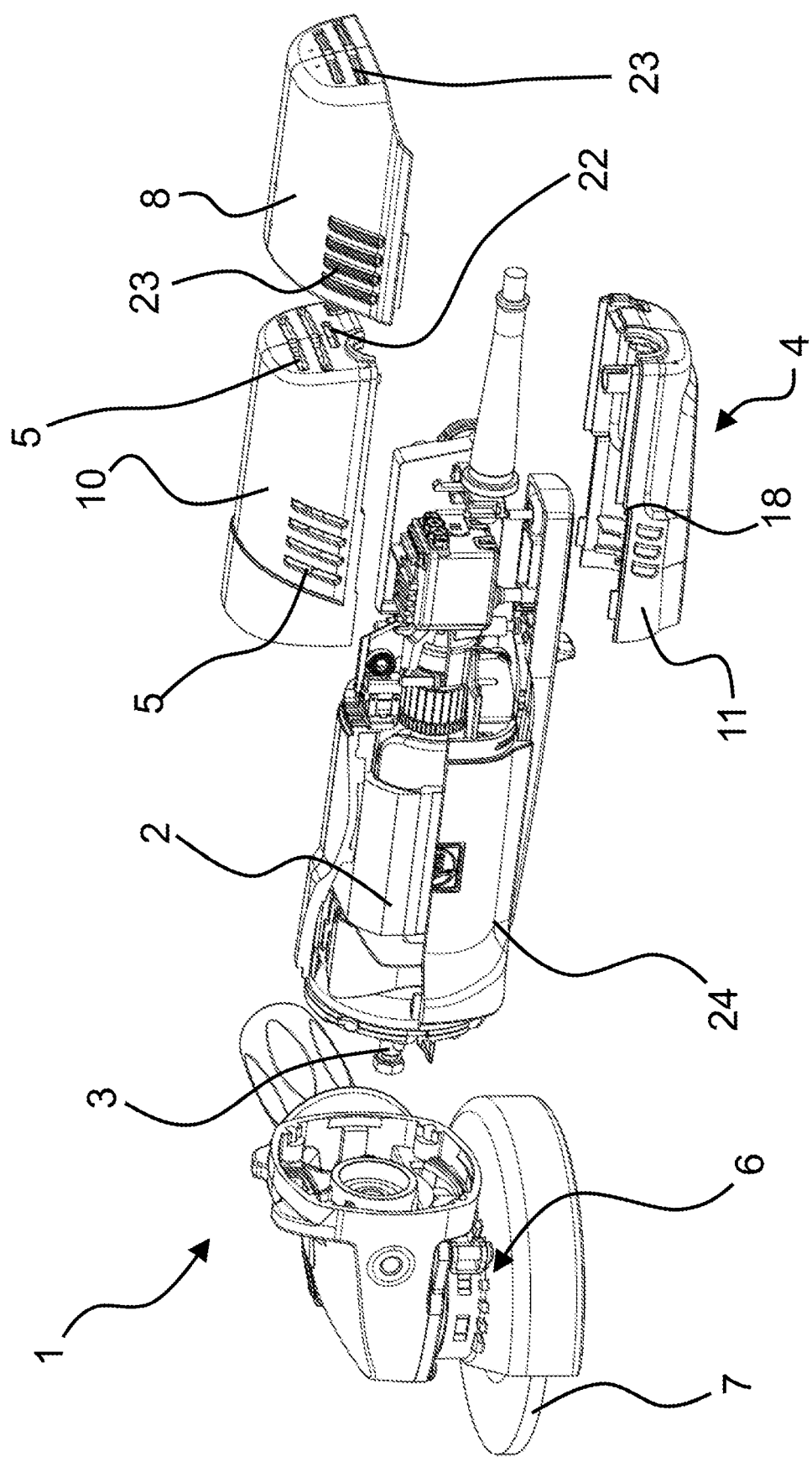
FIG. 1 shows a partial sectional exploded representation of a handheld power tool.

FIG. 1 shows an exploded representation of a handheld power tool 1 according to the invention, which, in the illustrated exemplary embodiment, is designed as an angle grinder. Handheld power tool 1 includes a drive 2 with a motor shaft 3, which is accommodated in a motor housing 24, which is part of a power tool housing 4, in which at least one air inlet 5 is formed. Handheld power tool 1 also has a tool interface 6, to which a tool 7 is attached, which, in the illustrated exemplary embodiment, is designed as a grinding wheel. In the area of the at least one air inlet 5, a dust protection element 8 may be attached, which may be pushed onto power tool housing 4 in an insertion direction 9 oriented essentially in parallel to the longitudinal axis of motor shaft 3, as is apparent, in particular, from FIG. 2. Power tool housing 4 has a multi-part design and comprises motor housing 24 as well as a first housing part 10 and a second housing part 11 in the area of dust protection element 8, which are connected to each other during assembly. The position, in particular the axial position, of dust protection element 8 relative to first housing part 10 is fixed by second housing part 11, as is explained in greater detail below, in particular on the basis of FIGS. 3 and 4. A latching connection is formed between dust protection element 8 and first housing part 10 by a securing tab 21, which is assigned to dust protection element 8 and is apparent in FIG. 5, and a corresponding securing recess 22, which is formed on first housing part 10.

Figure 2:
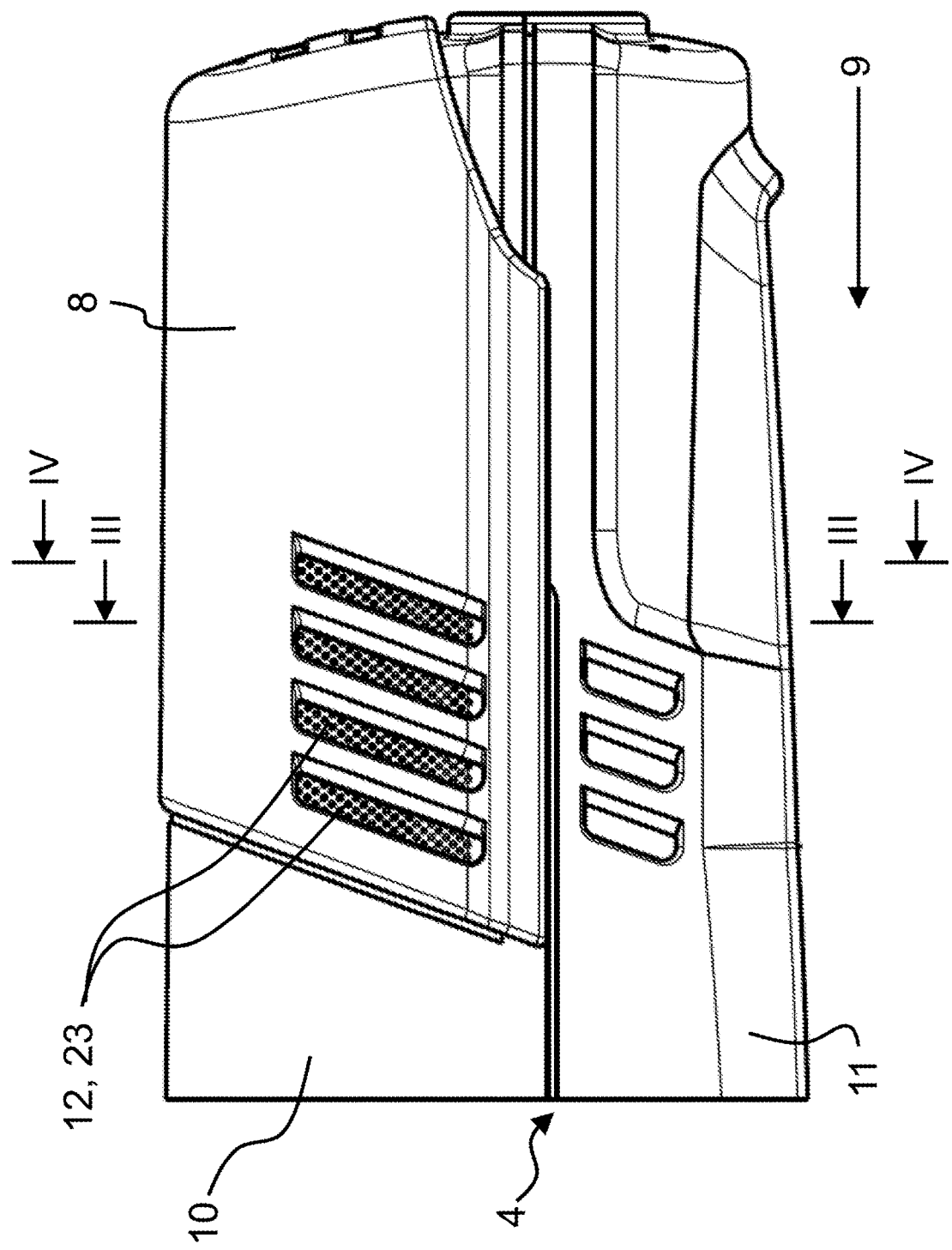
FIG. 2 shows a side view of one part of a power tool housing of the handheld power tool.

FIG. 2 shows a side view of power tool housing 4 in the area of dust protection element 8. In this figure, it is apparent, in particular, that dust protection element 8 has through-openings 23, which are protected by a screen structure 12 and which at least partially cover the at least one air inlet 5 when dust protection element 8 is mounted. The mesh width of screen structure 12 is 0.250 mm.

FIG. 3 shows a perspective view of section III-III of power tool housing 4 from FIG. 2. It is apparent herefrom, in particular, that dust protection element 8 has a receiving section 13, with which a coupling section 14 formed on first housing part 10 engages. Receiving section 13 of dust protection element 8 has an undercut 15 with an L-shaped cross section. In the illustrated exemplary embodiment, a tongue and groove joint is formed between dust protection element 8 and second housing 11, including a groove 16 assigned to second housing 11 and a tongue 17, which is formed on dust connection element 8. As is also apparent from the sectional view in FIG. 3, dust protection element 8 is adapted to the outer shape of first housing part 10, whereby dust protection element 8 may be easily pushed thereon. In the pushed-on state, dust protection element 8 then rests against the outer circumference of first housing part 10 over a wide area or at least in sections, and coupling sections 14 of first housing part 10 are accommodated in corresponding undercuts 15 of receiving sections 13 of dust protection element 8. If second housing part 11 is now connected to first housing part 10, tongue 17 engages with groove 16, whereby the tongue and groove connection between second housing part 11 and dust protection element 8 is established, and dust protection element 8 is secured on power tool housing 4.

As is apparent in the sectional view illustrated in FIG. 4 along section IV-IV from FIG. 2, a tongue and groove joint also exists between first housing part 10 and second housing part 11. In the illustrated exemplary embodiment, assembly grooves 19 are formed in first housing part 10, with which a securing tongue 20 assigned to second housing part 11 engages to form the tongue and groove joint between first housing part 10 and second housing part 11. This tongue and groove joint additionally prevents dust protection element 8 from being displaceable axially against insertion direction 9, since dust protection element 8 is fixed in its axial position by the tongue and groove joints. Insertion chamfers 18 are also used for this purpose, which are formed on second housing part 11 and are used to move dust protection element 8 axially in the direction of motor shaft 3 when second housing part 11 is mounted.

Figure 5:
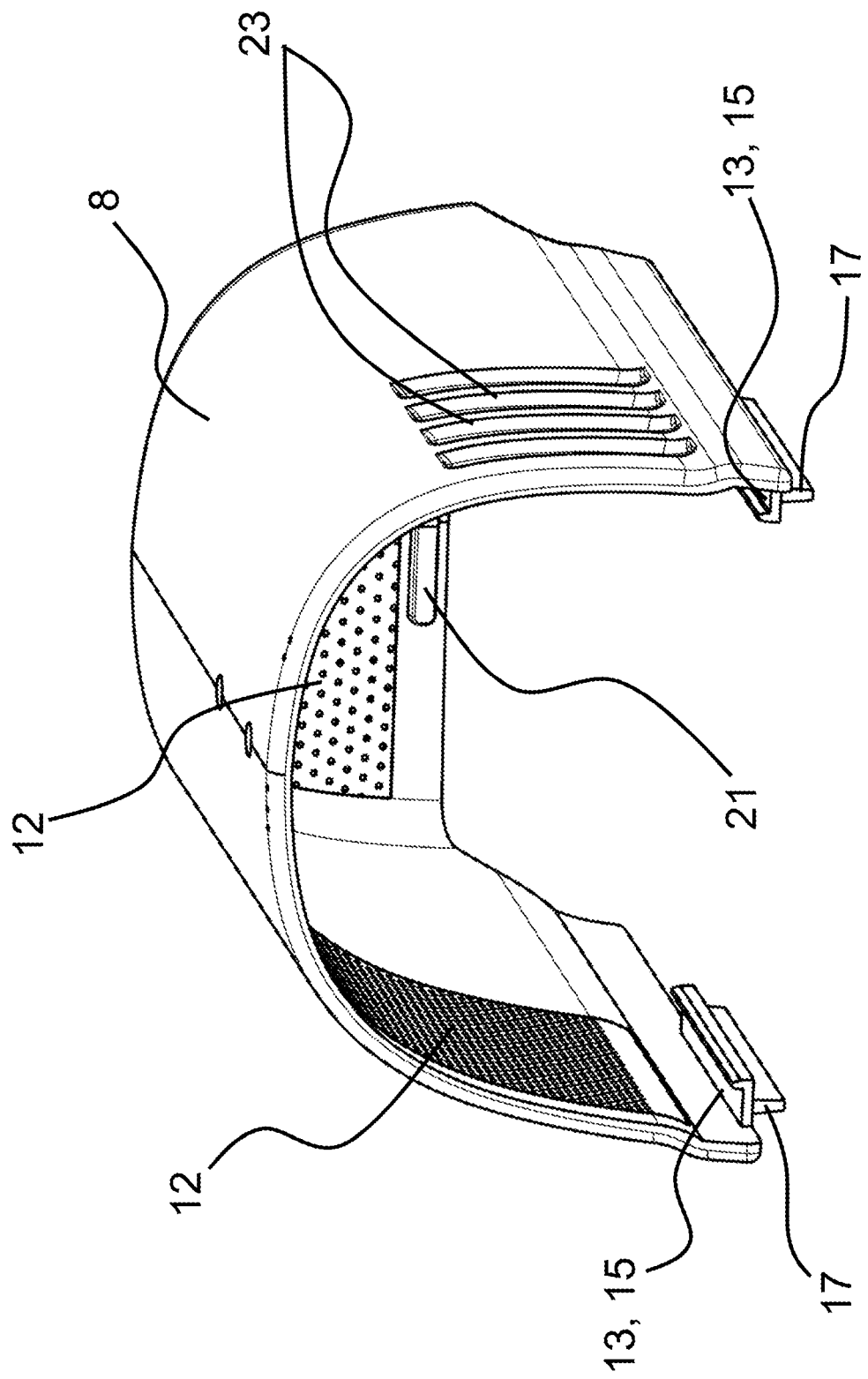
FIG. 5 shows a perspective view of a dust protection element of the handheld power tool.

FIG. 5 shows a perspective view of dust protection element 8, including screen structure 12 situated therein, which has multiple sections, each having a mesh width of 0.250 mm in the illustrated exemplary embodiment. Moreover, securing tab 21 is apparent on dust protection element 8 on the end face facing away from drive 2, which engages with securing recess 22 formed on first housing part 10 to form an axially operating latching connection in insertion direction 9—with regard to motor shaft 3—between dust protection element 8 and first housing part 10.

The assembly of handheld power tool 1 is explained once again below, in particular the mounting of dust protection element 8. Dust protection element 8 is first pushed axially onto first housing part 10 along insertion direction 9, which is preferably oriented in parallel to motor shaft 3. Coupling sections 14, which are formed on first housing part 10, engage with corresponding receiving sections 13, which are formed on dust protection element 8 and which each have undercut 15 with an L-shaped cross section. Securing tab 21 of dust protection element 8 engages with securing recess 22, which is formed on the outside of the end face of first housing part 10 facing away from drive 2. A latching connection between dust protection element 8 and first housing part 10 is formed hereby. In another step, second housing part 11 is mounted on the unit form from first housing part 10 and dust protection element 8 perpendicularly to insertion direction 9, a tongue and groove joint being formed between tongues 17 formed on dust protection element 8 and grooves 16 formed on second housing part 11, on the one hand, as well as between securing tongues 20 formed on second housing part 11 and assembly grooves 19 assigned to first housing part 10, on the other hand. Due to insertion chamfers 18 formed on second housing part 11, an axial force is applied to dust protection element 8 in insertion direction 9 when second housing part 11 is mounted on the unit formed from first housing part 10 and dust protection element 8, whereby any clearance that may be present between dust protection element 8 and first housing part 10 is eliminated but at least reduced.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A handheld power tool comprising:
a drive driving a motor shaft, which is accommodated in a power tool housing;
at least one air inlet formed in the power tool housing and covered by a dust protection element; and
a tool interface for connecting a tool,
wherein the dust protection element is pushed onto the power tool housing along an insertion direction and is secured on the power tool housing,
wherein the power tool housing has an at least two-part design and comprises a first housing part and a second housing part, the dust protection element being secured on the first housing part by the second housing part, and
wherein a first tongue and groove joint is formed between the first housing part and the second housing part and a second tongue and groove joint is formed between the dust protection element and the second housing part.

2. The handheld power tool according to claim 1, wherein the dust protection element at least partially surrounds the first housing part on an outside thereof and has a receiving section, with which a coupling section formed on the first housing part interacts.

3. The handheld power tool according to claim 2, wherein the receiving section of the dust protection element has an undercut.

4. The handheld power tool according to claim 3, wherein the undercut has an L-shaped cross section.

5. The handheld power tool according to claim 2, wherein the coupling section of the first housing part is slidable within the receiving section of the dust protection element in the insertion direction.

6. The handheld power tool according to claim 1, wherein at least one securing tab is formed on the dust protection element, which engages with at least one securing recess formed on the first housing part to form a latching connection.

7. The handheld power tool according to claim 1, wherein an insertion chamfer is formed on the second housing part.

8. The handheld power tool according to claim 1, wherein at least one screen structure is assigned to the dust protection element, which at least partially overlaps the at least one air inlet of the power tool housing when the dust protection element is mounted.

9. The handheld power tool according to claim 8, wherein the at least one screen structure has a mesh width between 0.100 mm and 0.500 mm or has a mesh width of 0.250 mm.

10. The handheld power tool according to claim 1, wherein the first housing part and the second housing part are connected to each other by a screw connection.

11. The handheld power tool according to claim 1, wherein the dust protection element is U-shaped, wherein each distal end of the U-shaped dust protection element has the receiving element.

12. The handheld power tool according to claim 1, wherein, when the dust protection element is mounted on the first housing part, a tongue of the dust protection element projects from the dust protection element in a direction that is perpendicular to the insertion direction and is received in a groove of the second housing part, wherein the tongue of the dust protection element and the groove of the second housing part form the second tongue and groove joint between the dust protection element and the second housing part.

* * * * *